United States Patent US010069373B2

(12) United States Patent
Peterson et al.

(10) Patent No.: US 10,069,373 B2
(45) Date of Patent: *Sep. 4, 2018

(54) LINEAR BEARING FOR AN ELECTROMAGNETIC SOLENOID AND SOLENOID HAVING SAID LINEAR BEARING

(71) Applicant: Flextronics Global Services Canada Inc. Services Globaux Flextronics Canada Inc., Toronto (CA)

(72) Inventors: Matthew Peterson, Ada, MI (US); Edward DeBeck, Holland, MI (US)

(73) Assignees: Flextronic Global Services Canada Inc., Toronto (CA); Services Globaux Flextronics Canada Inc., Toronto (CA)

( * ) Notice: Subject to any disclaimer, the term of this patent is extended or adjusted under 35 U.S.C. 154(b) by 12 days.

This patent is subject to a terminal disclaimer.

(21) Appl. No.: 15/701,173

(22) Filed: Sep. 11, 2017

(65) Prior Publication Data

US 2017/0373557 A1    Dec. 28, 2017

Related U.S. Application Data

(63) Continuation of application No. 14/299,232, filed on Jun. 9, 2014, now Pat. No. 9,762,101.

(51) Int. Cl.
*H02K 5/173* (2006.01)
*H02K 5/167* (2006.01)
(Continued)

(52) U.S. Cl.
CPC .......... *H02K 5/173* (2013.01); *F16C 19/305* (2013.01); *F16C 29/04* (2013.01); *F16C 33/38* (2013.01);
(Continued)

(58) Field of Classification Search
CPC .......... H02K 7/08; H02K 5/1672; H02K 5/16; H02K 5/173; H02K 5/1732; H02K 5/1735;
(Continued)

(56) References Cited

U.S. PATENT DOCUMENTS 6,313,726 B1    11/2001  Golovatai-Schmidt et al.
2013/0167950 A1*  7/2013  Nomichi ............ F02M 21/0239
                                                            137/487.5
(Continued)

FOREIGN PATENT DOCUMENTS

FR    1372144        9/1964
JP    H05-126275 A   5/1993
(Continued)

OTHER PUBLICATIONS

Hiroki Sakaguchi, Double Row Angular Ball Bearing and Retainer, Feb. 7, 2009, NSK LTD, JP 2009144900 (English Machine Translation).*

(Continued)

Primary Examiner — Bernard Rojas
Assistant Examiner — Alexander Singh
(74) Attorney, Agent, or Firm — Volpe and Koenig, P.C.

(57) ABSTRACT

A rolling-element bearing for an electromagnetic solenoid includes a hollow cylindrical cage with a plurality of spherical pockets formed around a first circumference and a second circumference of the cage. The pockets around the first circumference are offset from the pockets around the second circumference. Spherical rolling elements are provided in the spherical pockets and are captured for free rotation in the first pockets and second pockets.

18 Claims, 10 Drawing Sheets

(51) Int. Cl.
  *F16C 29/04* (2006.01)
  *F16C 33/38* (2006.01)
  *H02K 7/08* (2006.01)
  *F16C 33/40* (2006.01)
  *F16C 19/30* (2006.01)
  *H01F 7/16* (2006.01)
  *F16C 33/42* (2006.01)

(52) U.S. Cl.
  CPC ...... *F16C 33/3862* (2013.01); *F16C 33/3893* (2013.01); *F16C 33/405* (2013.01); *F16C 33/427* (2013.01); *H01F 7/1607* (2013.01); *H02K 5/167* (2013.01); *H02K 7/08* (2013.01); *F16C 33/40* (2013.01); *H01F 2007/163* (2013.01)

(58) Field of Classification Search
  CPC .... H02K 5/1737; H02K 5/167; H02K 5/1675; H02K 5/1677; H01F 7/1607; H01F 2007/163; F16C 29/0676; F16C 19/305; F16C 33/38; F16C 33/3856; F16C 33/385; F16C 33/3893; F16C 33/405; F16C 33/547; F16C 33/56; F16C 33/4617; F16C 33/427; F16C 33/40; F16C 29/04
  USPC .......... 310/90, 14; 384/49, 50, 51, 470, 523, 384/525, 560, 572, 614, 621, 623
  See application file for complete search history.

(56) References Cited

U.S. PATENT DOCUMENTS

2014/0014863 A1  1/2014  Najmolhoda
2014/0014864 A1  1/2014  Najmolhoda

FOREIGN PATENT DOCUMENTS

| JP | 2008-157287 A |   | 7/2008 |           |
|----|---------------|---|--------|-----------|
| JP | 2009-144900 A |   | 7/2009 |           |
| JP | 2009144900 A  | * | 7/2009 | F16C 33/40 |
| JP | 20090144900   |   | 7/2009 |           |

OTHER PUBLICATIONS

Sakaguchi, Hiroki, Double Row Angular Ball Bearing and Retainer for Double Row Angular Ball Bearing, Jul. 2, 2009, NSK Ltd., JP2009144900 (English Machine Translation).

* cited by examiner

LINEAR BEARING FOR AN ELECTROMAGNETIC SOLENOID AND SOLENOID HAVING SAID LINEAR BEARING

CROSS REFERENCE TO RELATED APPLICATION

This application claims the benefit of U.S. Pat. No. 9,762,101 filed on Jun. 9, 2014, which is incorporated by reference as if fully set forth.

FIELD OF INVENTION

Embodiments of the present invention generally relate to a linear motion bearing for electromagnetic solenoids.

BACKGROUND

Solenoids generally include a movable armature and a stationary pole piece with a pin couple to the armature and supported for linear displacement by a bushing in the pole piece. However, some solenoid-activated systems require less friction and greater tolerance to contamination than can be provided by a system including a bushing.

Accordingly, a need exists for a bearing to reduce friction and improve tolerance to contamination in an electromagnetic solenoid.

SUMMARY

Embodiments of a bearing with reduced friction and improved tolerance to contamination (robustness) are provided herein. In some embodiments, a cage for a rolling-element bearing for an electromagnetic solenoid comprises a plurality of spherical first pockets formed around a first circumference of the cage on a first pitch diameter and a plurality of spherical second pockets formed around a second circumference of the cage axially offset from the first circumference on a second pitch diameter, which may be equal to the first pitch diameter. The first pockets are angularly offset from the second pockets so the pockets.

In some embodiments, a rolling-element bearing for an electromagnetic solenoid comprises a cage including a plurality of spherical first pockets formed around a first circumference of a hollow cylindrical cage on a first pitch diameter. A plurality of spherical second pockets formed around a second circumference of the cage is axially offset from the first circumference on a second pitch diameter, which may be equal to the first pitch diameter, with the first pockets angularly offset from the second pockets. A plurality of spherical rolling elements is provided, one of the plurality captured for free rotation in each of the plurality of spherical first pockets and in each of the plurality of spherical second pockets.

In some embodiments, an electromagnetic solenoid comprises a flux sleeve disposed within a housing, a pole piece disposed within the housing axially aligned and spaced apart from the flux sleeve, the pole piece including a recess in the end adjacent to the flux sleeve and an axial bore through a length of the pole piece. An armature is disposed within the flux sleeve supported for axial displacement with a centrally located pin fixed to an end portion of the armature proximate to the pole piece for axial displacement with the armature. A rolling-element bearing is disposed for free movement within the axial bore including, the rolling-element bearing including a cage including a plurality of spherical first pockets formed around a first circumference of the cage on a first pitch diameter and a plurality of spherical second pockets formed around a second circumference of the cage axially offset from the first circumference on a second pitch diameter, which may be equal to the first pitch diameter, the first pockets angularly offset from the second pockets. A plurality of spherical rolling elements, one of the plurality is captured for free rotation in each of the plurality of spherical first pockets and in each of the plurality of spherical second pockets. The pin is accepted within the hollow cylindrical cage and supported on one or more of the spherical rolling elements.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

While the present invention may be described in reference to an automotive system, the present invention may be modified for a variety of applications while remaining within the spirit and scope of the claimed invention, since the range of the potential applications is great, and because it is intended that the present invention be adaptable to many such variations.

DETAILED DESCRIPTION

Figure 1:
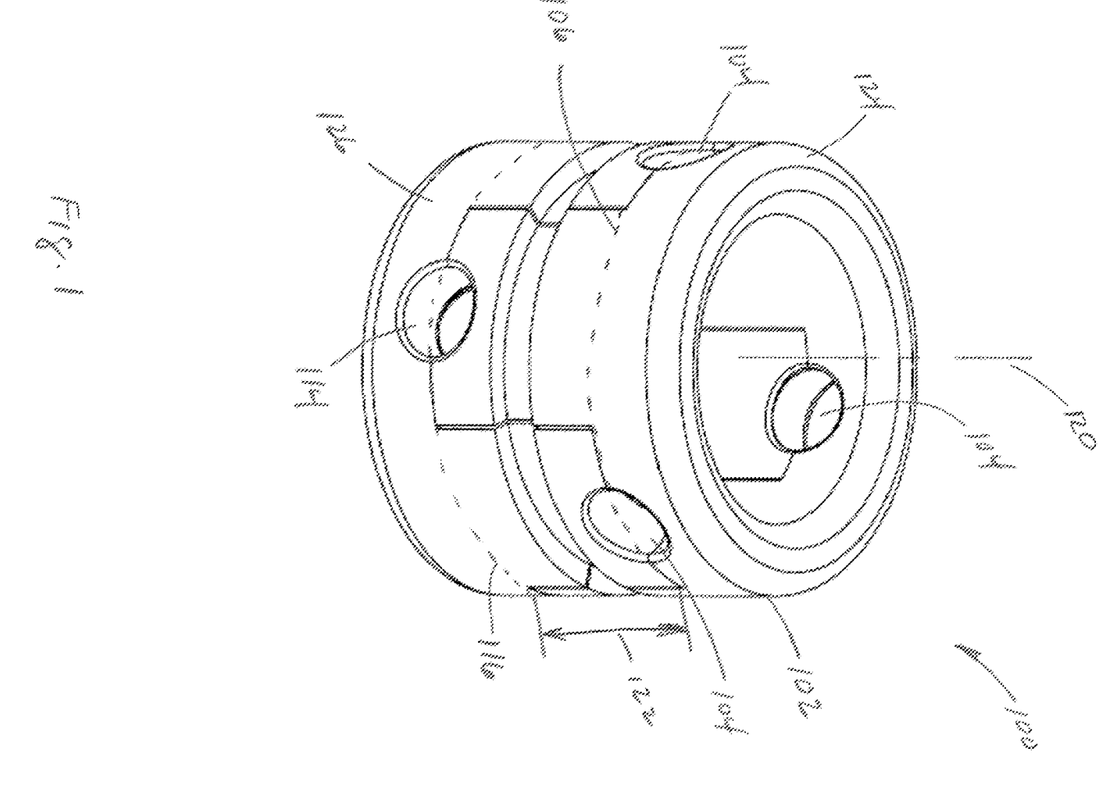
FIG. 1 is a perspective view depicting a rolling element cage in accordance with an embodiment of the present invention.

FIG. 1 depicts an exemplary non-magnetic rolling-element cage, cage 100, comprising a hollow cylindrical body 102 comprising a plurality of first spherical pockets, first pockets 104, formed in the plane of a first circumference 106. The cage 100 may be formed from one or more non-magnetic metals, such as brass, some stainless steels, or from one or more non-magnetic materials, such as plastic materials.

A plurality of second spherical pockets, second pockets 114, is formed in the plane of a second circumference 116. As used throughout this disclosure, "spherical pockets" or "semi-spherical pockets" are spherically shaped, i.e., the walls of the pockets are portions of a spherical surface. This may include a plurality of features formed on a portion of the cage 100 adjacent to the first and second pockets 104, 114 configured to create at least a partial spherical surface.

The planes of the first circumference 106 and the second circumference 116 are parallel and separated in an axial direction corresponding to axis 120 by a distance 122. For ease of illustration, the non-limiting embodiment of FIG. 1 depicts three first pockets 104 in the plane of the first circumference 106 and three second pockets 114 (2 are hidden) in the plane of the second circumference 116 (as may be understood from FIGS. 1A, 1B, and 2). However, other embodiments may have two first or second pockets, or more than three first or second pockets, and the number of first pockets may be different than the number of second pockets.

Figure 1A:
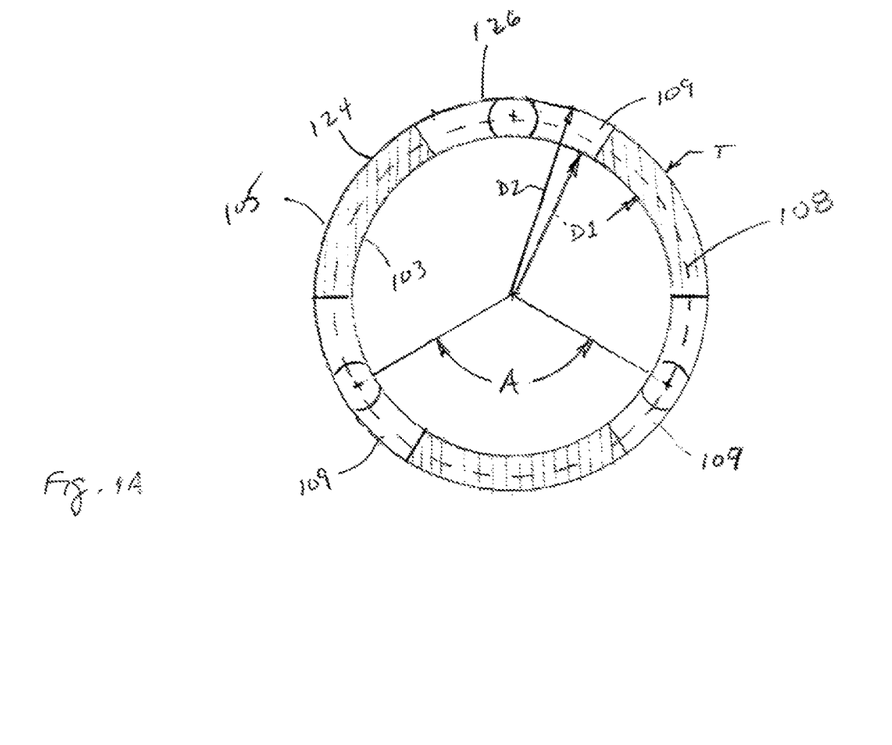
FIG. 1A depicts a cross-sectional view of the rolling element cage of FIG. 1 taken at circumference 106.
Figure 1B:
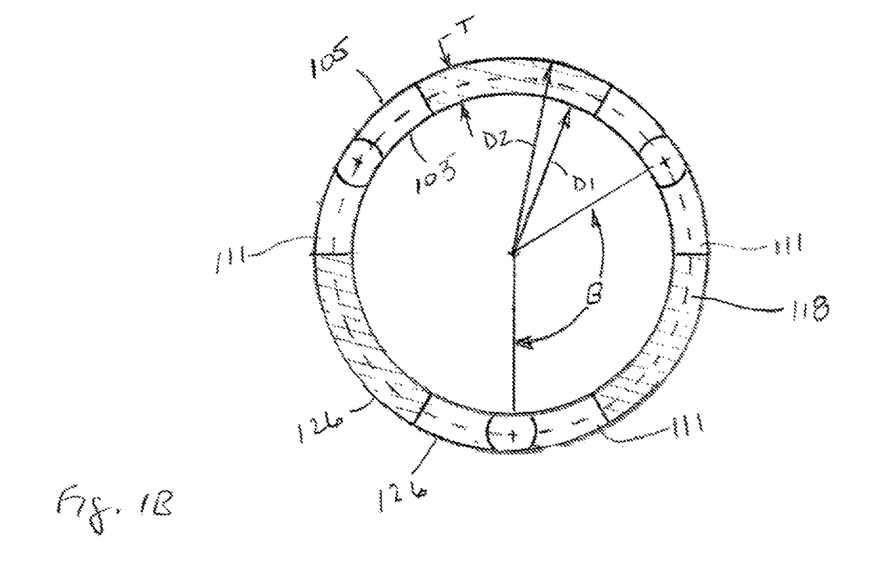
FIG. 1B depicts a cross-sectional view of the rolling element cage of FIG. 1 taken at circumference 116.

The centers of each of the first pockets 104 lie on a pitch circle 108 as illustrated in FIG. 1A. Similarly, the centers of each of the second pockets 114 lie on a second pitch circle 118 as shown in FIG. 1B. As used herein, a pitch circle (i.e., first pitch circle 108 or second pitch circle 118) is a circle formed through the center points of each of the pockets (i.e., first pockets 104 or second pockets 114).

The first pockets 104 are angularly offset from the second pockets 114 when viewed along axis 120. As illustrated, the three first pockets 104 are evenly, or substantially evenly spaced around the first pitch circle 108 by and angle A and the three second pockets 114 are similarly evenly or substantially evenly spaced around the second pitch circle 118 by and angle B. As such, adjacent first pockets 104 (or second pockets 114) are angularly spaced apart by the angle A (or angle B) of about 120 degrees from each other. The first pockets 104 are evenly, or substantially evenly, angularly offset from second pockets 114. Accordingly, in the non-limiting embodiment illustrated, the first pockets 104 are radially offset form the second pockets 114 by 60 degrees. In other embodiment, the offset may be greater than 60 degrees or less than 60 degrees.

Figure 2:
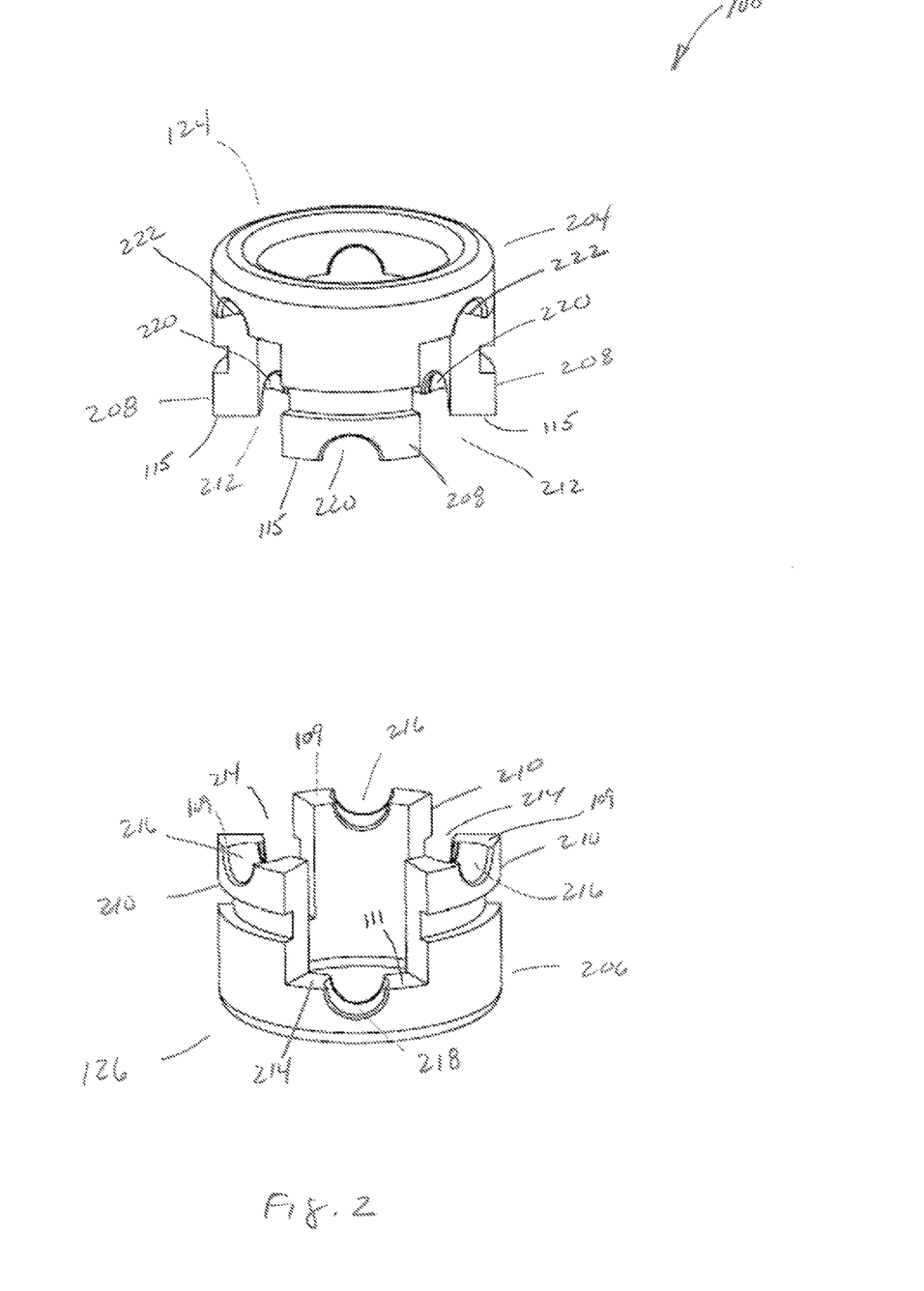
FIG. 2 depicts an exploded view of the rolling element cage of FIG. 1

In the non-limiting embodiments of FIG. 2, the cage 100 comprises two hollow cylindrical halves, first half 124 and second half 126, which are identical according to the embodiment illustrated, but are not necessarily identical. As illustrated in FIGS. 1A and 1B, first half 124 and second half 126 have an inner diameter D1 and an outer diameter D2 and a wall thickness T between the inner wall 103 and outer wall 105. The first half 124 has a first side 204 including a plurality of evenly spaced first projections 208 (3 shown) and evenly spaced first recesses 212 (3 shown). The second half 126 has a first side 206 including a plurality of evenly spaced second projection 210 (3 shown) and evenly spaced second recess 214 (3 shown). As illustrated the first projections 208 and first recesses 212 and the second projection 210 and second recess 214 are equal in number, although they need not be equal in number.

At least some of the second projection 210 includes a semi-spherical pocket 216 (i.e., one half of the spherically shaped first pocket 104) formed on an edge 109 of the wall thickness T. At least some second recess 214 includes a semi-spherical pocket 218 (i.e., one half of the spherically shaped second pocket 114) formed on an edge 111.

At least some first projection 208 includes a semispherical pocket 220 formed on an edge 115 of the wall thickness T. At least some first recess 212 includes a semi-spherical pocket 222 (i.e., one half of the spherically shaped first pocket 104) formed on the edge 113 of the wall thickness T. Each of the semi-spherical pockets 216, 218, 220, 222 is centrally located at a midpoint of the wall thickness T.

The first and second recesses 212, 214 may be formed as the negative of the first and second projections 208, 210 so that the first and second projections 208, 210 can be inserted into the first and second recesses 212, 214 (i.e., the recesses 212, 214 receive the projections 208, 210). As such, in some embodiments, a first half 124 and a second half 126 can be positioned with first and second projections 208, 210, respectively, in opposition (i.e., facing each other) and brought together such that the first projections 208 are aligned with the second recesses 214 and the first recesses 212 are aligned with second projections 210.

When the first projections 208 and second projections 210 and the first recesses 212 and second recesses 214 are brought together as described above, the semi-spherical pockets 220 in the first projections 208 are aligned with the second semi-spherical pockets 218 in the second recess 214 and together form the spherical second pocket 114. Likewise, the semi-spherical pockets 222 in the first recess 212 are aligned with the semi-spherical pockets 216 in the associated second projections 210 and together form the spherical first pockets 104.

A plurality of spherical rolling elements 302, for example ball bearings, is disposed in the first pockets 104 and the second pockets 114 and captured for free rotation within the spherical pockets. The rolling elements 302 have a diameter 304 greater than the wall thickness T. The first and second pockets 104, 114 are positioned in the wall thickness T such that a first portion 308 of each of the plurality of spherical rolling elements 302 extends radially outwardly from the outer wall 105 of the cage 100 and a second portion 310 of each of the plurality of spherical rolling elements 302 extends radially inwardly from the inner wall 103.

Figure 5:
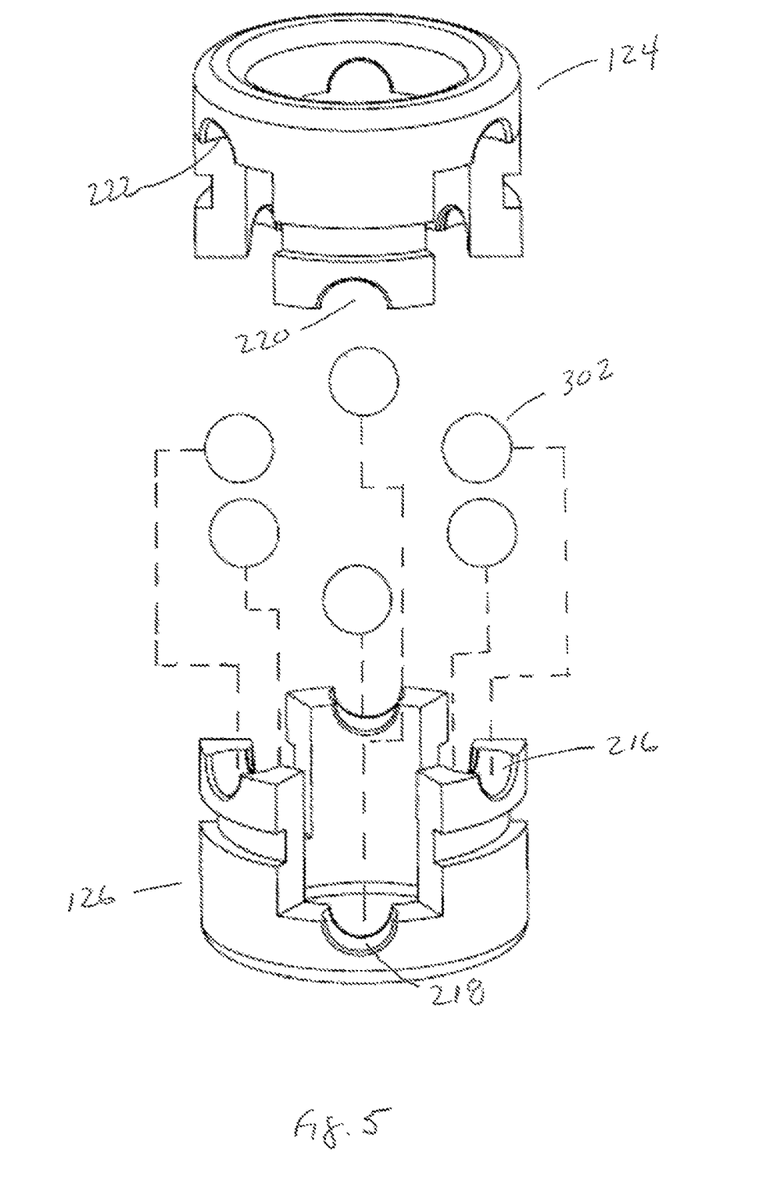
FIG. 5 depicts an exploded view of a rolling-element bearing in accordance with an embodiment of the present invention.

The spherical rolling elements 302 may be placed in upwardly directed semi-spherical pockets, for example second semi-spherical pockets 216, 218 as illustrated in FIG. 5. First half 124 and second half 126, positioned as above such that the projections and recesses are aligned and brought into engagement, form the spherical first and second pockets 104, 114 and capture the spherical rolling elements 302 for free rotation.

In other embodiments, the cage may be a stamped metal construction formed from a plurality of stamped metal components assembled to yield pockets configured to capture spherical rolling elements as described above. In other embodiments, the cage may be formed from one or more molded, stamped, or otherwise formed metal or plastic components configures to capture a plurality of spherical rolling elements for free rotation in two or more planes, with the rolling elements in adjacent planes disposed in a radially staggered orientation.

Figure 6A:
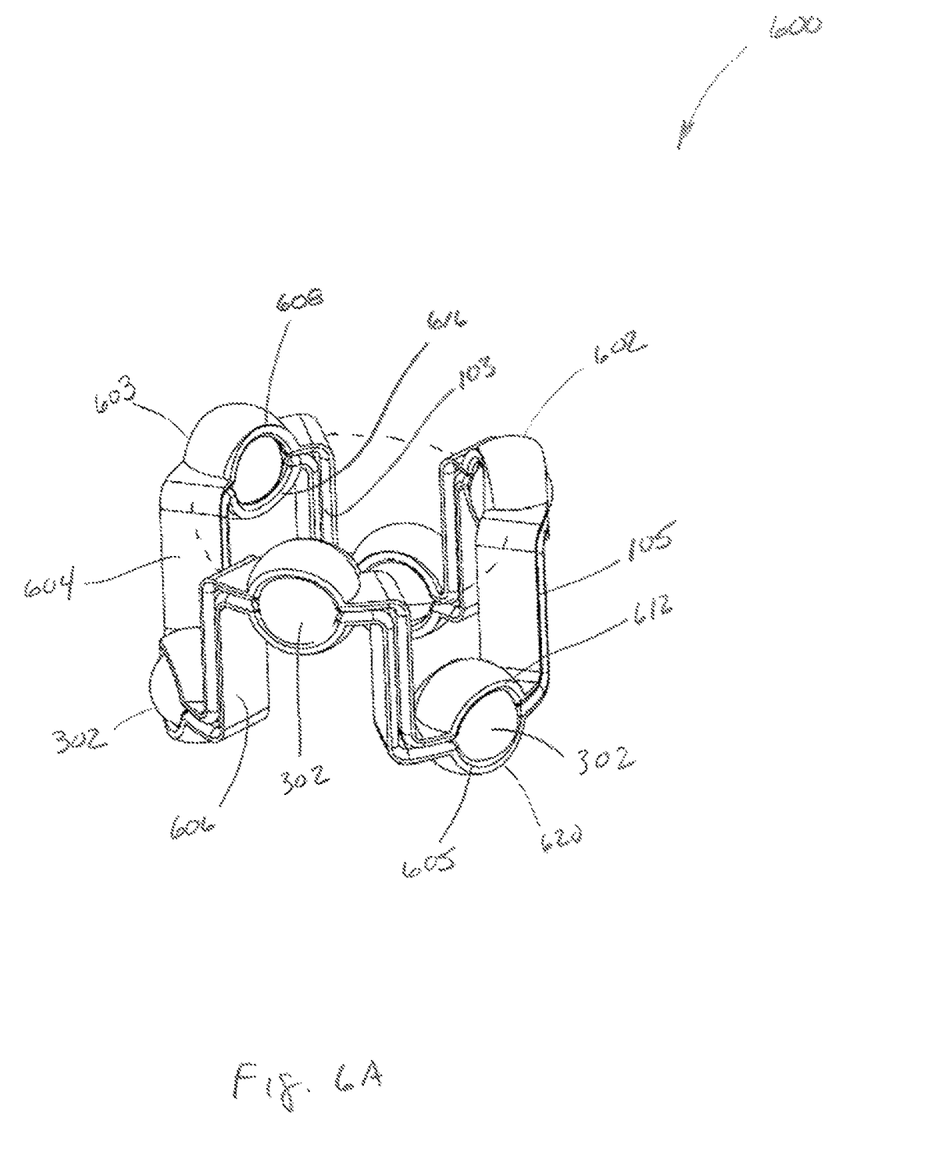
FIG. 6A depicts a perspective view of a rolling-element bearing according to an embodiment of the present invention.

For example, FIG. 6A depicts a rolling element bearing 600 comprising a cylindrical cage 602 capturing spherical rolling elements 302 for free rotation in spherical pockets 603 formed on a first pitch diameter and an equal plurality of pockets 605 formed on a second pitch diameter. The cylindrical cage 602 is formed from molded or stamped elements 604, 606 which are which are identical, including equal pitch diameters, according to the embodiment illustrated, but are not necessarily identical. Elements 604, 606 are non-magnetic, and may be formed from any of the material discussed above.

Figure 6B:
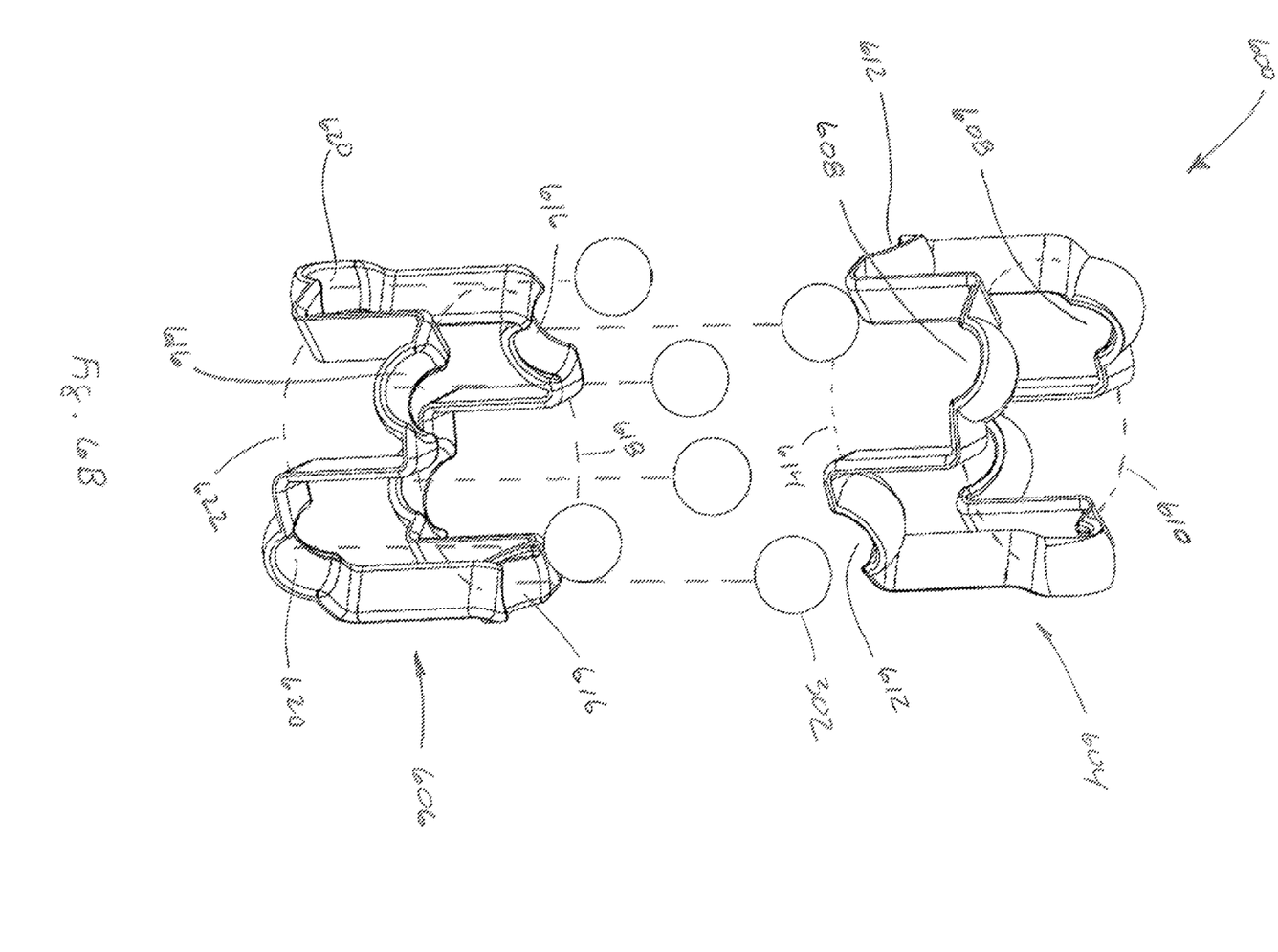
FIG. 6B depicts an exploded view of the rolling-element bearing of 6A.

FIG. 6B depicts an exploded view of the rolling element bearing 600 for clarity. Similar to the embodiments discussed above, the plurality of spherical pockets 603 and 605 are partially formed by details in elements 604 and 606. As illustrated, element 604 has a plurality of semi-spherical pockets 608, open downward, formed in the plane of a circumference 610 and an equal plurality of semi-spherical pockets 612, also open downward, formed in the plane of a circumference 614 spaced apart from the plane of circumference 610.

Similar to element 604, element 606 has a plurality of semi-spherical pockets 616 formed in the plane of a circumference 618 and a plurality of semi-spherical pockets 620 formed in the plane of circumference 622. Element 606 is element 604 inverted so that the semi-spherical pockets 608 and 612 are open upward and rotated such that semi-spherical pockets 616 and 620 align with semi-spherical pockets 608 and 612 of element 604.

As illustrated in FIG. 6B, spherical rolling elements 302 can be placed in upward facing semi-spherical pockets 616 and 620. Element 604 and 606 can then be brought into engagement such that semi-spherical pockets 608 and 616 form spherical pocket 603 and semi-spherical pockets 612 and 620 form spherical pocket 605. Spherical rolling elements 302 are captured for free rotation in the spherical pockets 603, 605.

Elements 604, 606 may be joined together in any known manner, such as adhesive bonding, welding, heat staking, or the like.

Figure 3:
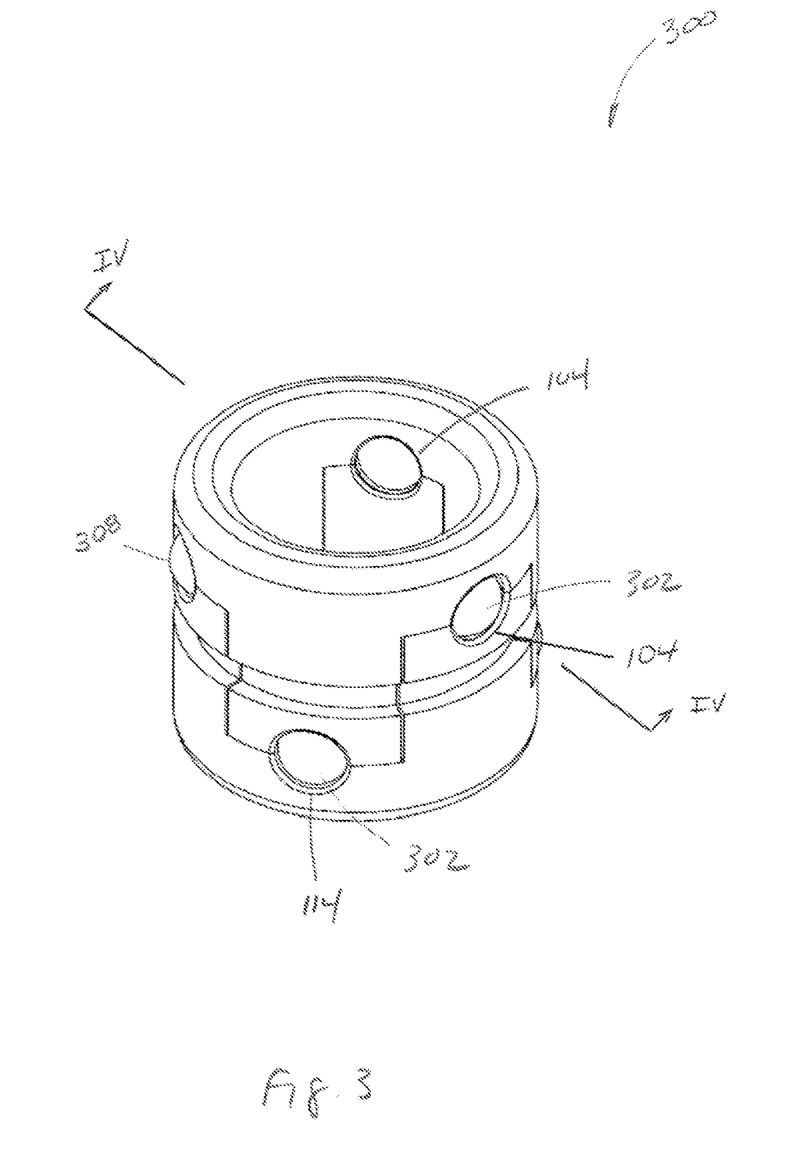
FIG. 3 depicts a perspective view of a rolling-element bearing according to an embodiment of the present invention.
Figure 4:
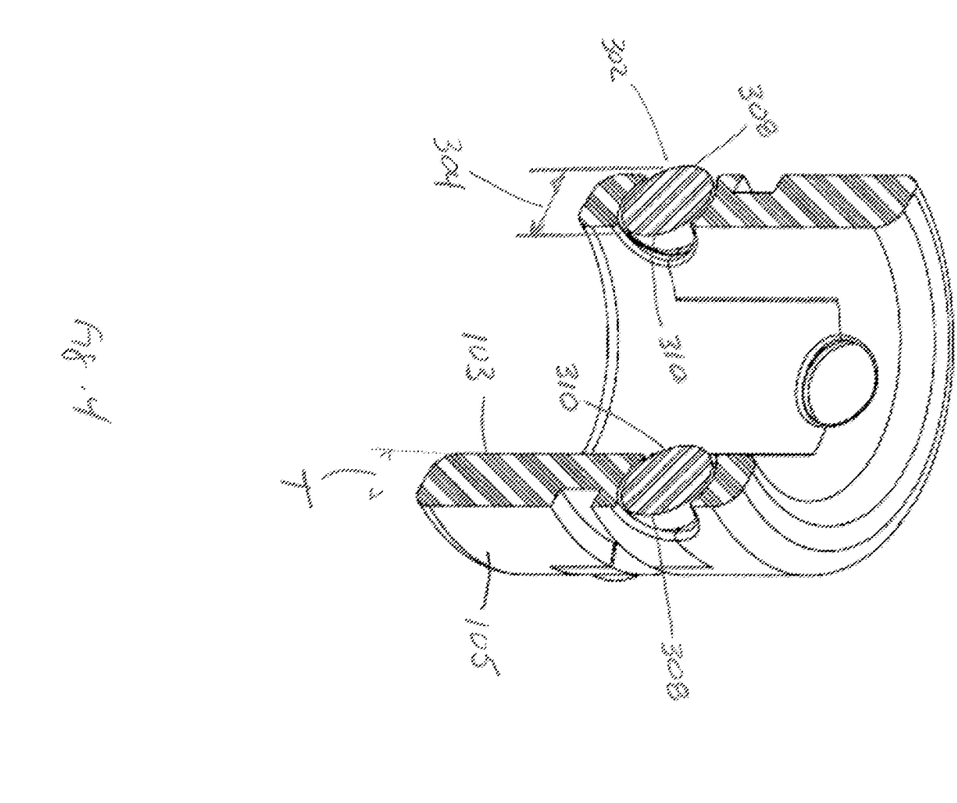
FIG. 4 depicts a longitudinal section of the rolling-element bearing of FIG. 3 taken along line IV-IV.

The cages 100, 602 assembled as described in the embodiments above with spherical rolling elements 302 captured for free rotation within the pockets 104, 114 or 603, 605 forms a rolling-element bearing 300 or 600 as shown in FIGS. 3 and 6 suitable for use in an electromagnetic solenoid according to embodiments of this invention.

Figure 7:
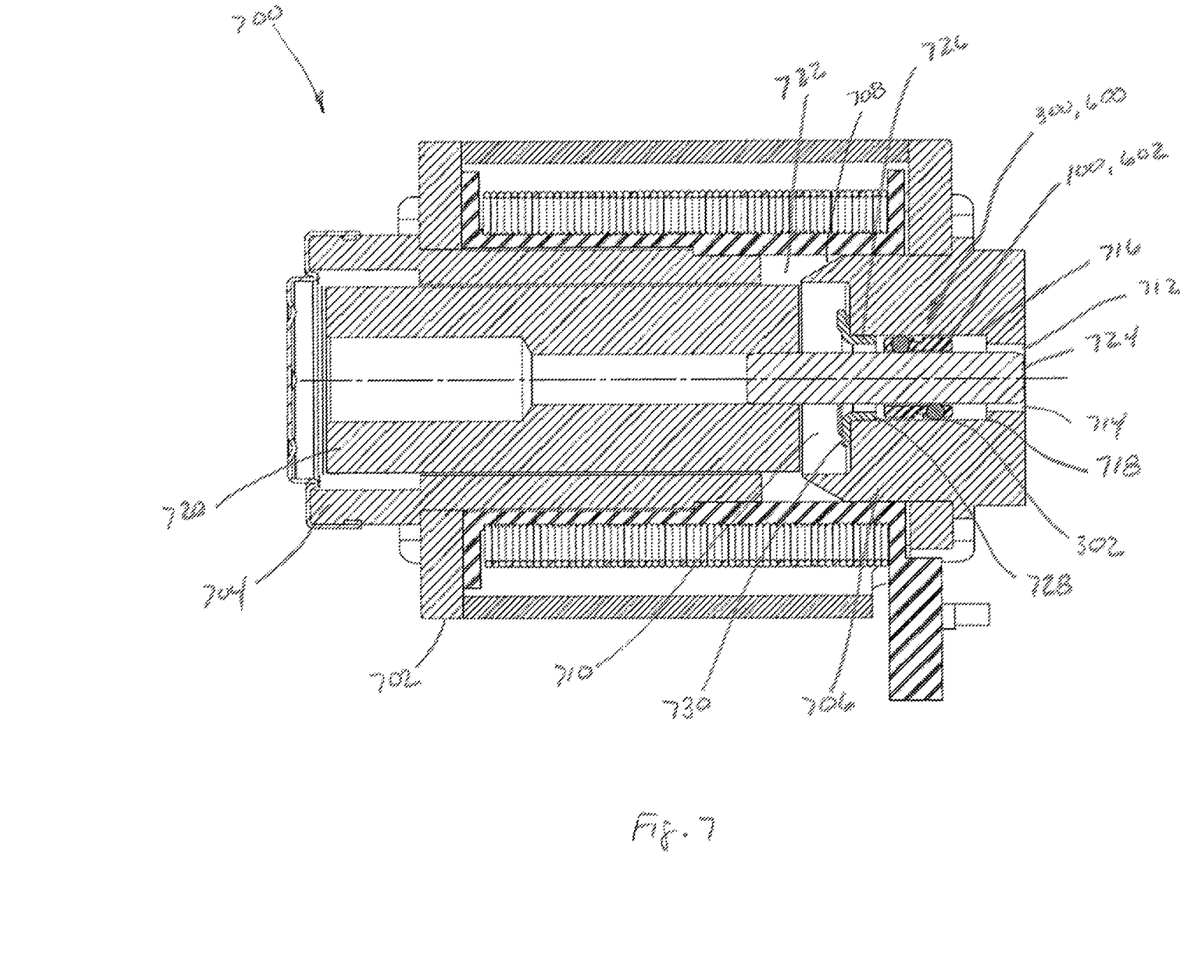
FIG. 7 schematically depicts a solenoid including a rolling element bearing in accordance with an embodiment of the present invention.

FIG. 7 depicts a non-limiting embodiment of an electromechanical solenoid, solenoid 700, including rolling-element bearing 300,600, in accordance with an embodiment of the present invention. The solenoid 700 is shown in a simplified, schematic form for clarity.

The solenoid 700 includes a flux sleeve 704 and a pole piece 706 aligned and coaxially disposed in a spaced apart relationship within a housing 702. The pole piece 706 has a first end 708 adjacent to the flux sleeve 704 including a recess 710. The pole piece 706 includes an axial bore 712 through the length of the pole piece 706. The axial bore 712 as illustrated includes a first portion 714 having a first diameter and a second portion 716 having a larger diameter than the first portion 714. A ledge 718 is formed in the area where the first portion 714 and the second portion 716 meet.

An armature 720 is disposed and supported for axial displacement within the flux sleeve 704. As illustrated, a portion of the armature 720 may extend beyond the flux sleeve 704 at a point in the axial displacement of the armature 720. At least the end portion 722 of the armature 720 is sized to be at least partially received within the recess 710 in the pole piece 706.

A non-magnetic pin, pin 724, is coupled to at least the end portion 722 of the armature 720, for example by a press fit or other mechanical attachment, for axial displacement with the armature 720. The pin 724 extends beyond the end portion 722 of the armature and into and through the length of the pole piece 706. A rolling-element bearing 300,600 is disposed for free axial and radial movement within the axial bore 712 in the second portion 716, and accepts and supports a portion of the pin 724. As discussed above, second portions 310 of the spherical rolling elements 302 extend radially inwardly from the inner wall 103 of the cage 100,602. The pin 724 rests on at least some of the spherical rolling elements 302 on the second portion 310.

A bearing stop 726 is provided at the end of the second portion 716 adjacent to the armature 720 with the bearing stop 726 disposed at least partially within the second portion 716. A first end 728 of the bearing stop 726 provides a first limit to the axial displacement of the rolling-element bearing 300,600 within the second portion 716. A second limit to the axial displacement of the rolling-element bearing 300,600 is provided by the ledge 718. Accordingly, the free movement of the rolling-element bearing 300,600 is limited by the first end 728 of the bearing stop 726 and the ledge 718.

As the armature 720 is displaced axially within the flux sleeve 704 and at least partially within the recess 710 of the pole piece 706, the pin 724 is displaced a corresponding amount. Because the pin 724 is supported on the spherical rolling elements 302, as the pin 724 is displaced, the spherical rolling elements 302 roll with the pin 724. Because the spherical rolling elements 302 are captured within the spherical first and second pockets 104, 114, the rolling-element bearing 300,600 is also displaced within the second portion 716.

Axial displacement of the armature 720 is limited in a first direction (toward the pole piece 706) by a second end 730 of the bearing stop 726 disposed in the recess 710. The second end 730 provides a physical stop for the armature 720 and also prevents the armature 720 from contacting the pole piece ("latching"). Axial displacement of the armature 720 in a second direction, opposite the first direction, is limited by an end cap (not shown) at an end of the flux sleeve 704 opposite the pole piece 706.

Figure 8:
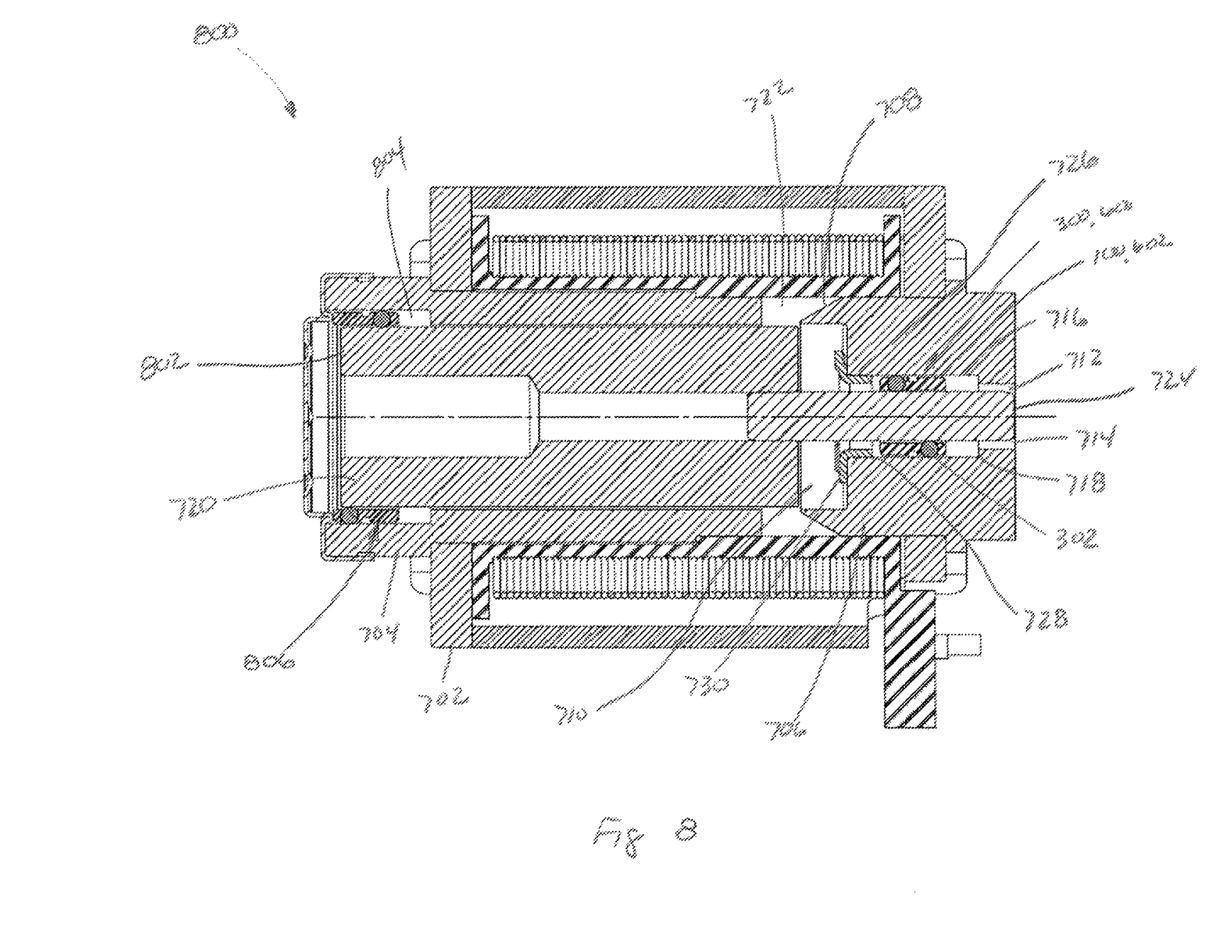
FIG. 8 schematically depicts a solenoid including two rolling element bearings in accordance with an embodiment of the present invention To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

FIG. 8 depicts a non-limiting embodiment of an electromechanical solenoid, solenoid 800, including many of the features of solenoid 700. Solenoid 800 includes a rolling-element bearing 806 at the back side 802 of the armature 720 in a pocket 804 between a larger diameter portion of the flux sleeve 704 and the armature 720. The rolling-element bearing 806 may be of similar construction to either of the rolling-element bearings 300 or 600. The rolling-element bearing 806 has an inner diameter suitable to accept the armature 720 and an outer diameter suitable to fit within the pocket 804.

The rolling-element bearing 806 has been observed to provide guidance to the back side 802 of the armature 720 in linear travel and generally reduce the friction in the solenoid 800.

The inventor has observed that placing a plurality of spherical rolling elements in pockets arranged in parallel planes, and radially offsetting the pockets between adjacent planes, substantially reduces the tendency of the rolling-element bearing from tipping in the pole piece. Tipping of the bearing has been observed to cause contact between the pin and the pole piece or possibly binding between the spherical rolling elements and the pin. Either condition increases the resistance to axial displacement of the armature.

Thus a cage for an electromagnetic solenoid, a bearing using the cage, and an electromagnetic solenoid using the bearing are provided herein. The inventive bearing may advantageously reduce friction and increase solenoid robustness against contamination.

What is claimed is:

1. A cage for a rolling-element bearing for an electromagnetic solenoid comprising:
   a hollow cylindrical body formed from a first hollow cylindrical element having a first wall thickness and a second hollow cylindrical element having a second wall thickness;
   a plurality of spherical first pockets formed around a first circumference of the hollow cylindrical body on a first pitch diameter; and
   a plurality of spherical second pockets formed around a second circumference of the hollow cylindrical body axially offset from the first circumference on a second pitch diameter equal to the first pitch diameter, wherein
   the first hollow cylindrical element includes a plurality of first projections and plurality of first recesses formed on a first side of the first hollow cylindrical element,
   the second hollow cylindrical element includes a plurality of second projections and a plurality of second recesses formed on a first side of the second hollow cylindrical element, and
   each of the first projections and first recesses, and each of the second projections and second recesses includes a semi spherical pocket formed on an edge of the first wall thickness and second wall thickness, respectively, wherein
   the first side of the first hollow cylindrical body is positioned with the first side of the second hollow cylindrical body such that the first sides in opposition can be assembled together such that each of the spherical first pockets is formed from equal halves of the semi spherical pocket of a first recess and the semi spherical pocket of a second projection and each of the spherical second pockets is formed from equal halves of the semi spherical pocket of a second recess and the semi spherical pocket of a first projection.

2. The cage of claim 1, wherein:
   the first projections on the first side of the first hollow cylindrical element are evenly spaced;
   the first recesses on the first side of the first hollow cylindrical element are evenly spaced;
   the second projections on the first side of the second hollow cylindrical element are evenly spaced; and
   the second recesses on the first side of the second hollow cylindrical element are evenly spaced.

3. The cage of claim 1, wherein the first hollow cylindrical element and the second hollow cylindrical element are identical.

4. The cage of claim 1, wherein each of the semi-spherical pockets is centrally located at a midpoint of the wall thickness.

5. The cage of claim 1, wherein the plurality of spherical first pockets are angularly offset from the plurality of spherical second pockets.

6. The cage of claim 1, wherein the cage is formed from a non-magnetic material.

7. A rolling-element bearing for an electromagnetic solenoid comprising:
   the cage of claim 1; and
   a plurality of spherical rolling elements,
   wherein one spherical rolling element of the plurality of spherical rolling elements is captured for free rotation in each of the plurality of spherical first pockets and the plurality of spherical second pockets.

8. The rolling-element bearing of claim 7, wherein:
   the first projections on the first side of the first hollow cylindrical element of the cage are evenly spaced;
   the first recesses on the first side of the first hollow cylindrical element of the cage are evenly spaced;
   the second projections on the first side of the second hollow cylindrical element of the cage are evenly spaced; and
   the second recesses on the first side of the second hollow cylindrical element of the cage are evenly spaced.

9. The rolling-element bearing of claim 7, wherein a diameter of each the plurality of spherical rolling elements is greater than the wall thickness.

10. The rolling-element bearing of claim 7, wherein a first portion of each of the plurality of spherical rolling elements extends radially outwardly from an outer wall of the cage and a second portion of each of the plurality of spherical rolling elements extends radially inwardly from an inner wall of the cage.

11. The rolling-element bearing of claim 7, wherein the cage is a stamped metal construction formed from a non-magnetic metal.

12. The rolling-element bearing of claim 7, wherein the cage is formed from plastic.

13. An electromagnetic solenoid comprising:
   a flux sleeve disposed within a housing;
   a pole piece disposed within the housing axially aligned and spaced apart from the flux sleeve, the pole piece including a recess in an end adjacent to the flux sleeve and an axial bore through a length of the pole piece;
   an armature disposed within the flux sleeve supported for axial displacement having an end portion proximate to the pole piece and a backside end portion proximate to a larger diameter portion of the flux sleeve;
   a centrally located pin fixed to the end portion of the armature for axial displacement with the armature; and
   a first rolling-element bearing, disposed for free movement within the axial bore including:
   a hollow cylindrical body having a linear central axis, comprising a first hollow cylindrical element having a first wall thickness and a second hollow cylindrical element having a second wall thickness;
   a plurality of spherical first pockets formed around a first circumference of the hollow cylindrical body on a first pitch diameter;
   a plurality of spherical second pockets formed around a second circumference of the hollow cylindrical body axially offset from the first circumference on a second pitch diameter equal to the first pitch diameter; and
   a plurality of spherical rolling elements, wherein
   the first hollow cylindrical element includes a plurality of first projections and plurality of first recesses formed on a first side of the first hollow cylindrical element,
   the second hollow cylindrical element includes a plurality of second projections and a plurality of second recesses formed on a first side of the second hollow cylindrical element, and
   each of the first projections and first recesses, and each of the second projections and second recesses includes a semi spherical pocket formed on an edge of the first wall thickness and second wall thickness, respectively, wherein the first side of the first hollow cylindrical body is positioned with the first side of the second hollow cylindrical body such that the first sides in opposition can be assembled together such that each of the spherical first pockets is formed from equal halves of the semi spherical pocket of a first recess and the semi spherical pocket of a second projection and each of the spherical second pockets is formed from equal halves of the semi spherical pocket of a second recess and the semi spherical pocket of a first projection, the plurality of spherical first pockets are angularly offset from the plurality of spherical second pockets, each of the plurality of spherical first pockets and each of the plurality of spherical second pockets captures one spherical rolling element of the plurality of spherical rolling elements, and the pin is accepted within the hollow cylindrical body and supported on one or more of the spherical rolling elements.

14. The electromagnetic solenoid of claim 13, wherein the axial bore includes:

a first portion having a first diameter; and a second portion having a larger second diameter adjacent the recess and forming a ledge, wherein the rolling-element bearing is disposed in the second portion of the axial bore.

15. The electromagnetic solenoid of claim 14, further comprising a bearing stop disposed at least partially in the second portion of the axial bore, wherein the free movement of the rolling-element bearing includes axial displacement in the second portion of the axial bore between a first end of the bearing stop and the ledge.

16. The electromagnetic solenoid of claim 15, wherein the axial displacement of the armature is limited by a second end of the bearing stop disposed in the recess providing a physical stop.

17. The electromagnetic solenoid of claim 13, further comprising:

a second rolling-element bearing, including the elements of the first rolling-element bearing of claim 13, disposed for free movement within a pocket between the larger diameter portion of the flux sleeve and the armature, wherein the first circumference and the second circumference of the second rolling-element bearing are greater in diameter than the first circumference and the second circumference of the first rolling-element bearing, and the backside end of the armature is accepted within the second hollow cylindrical body and supported on one or more of the spherical rolling elements.

18. The electromagnetic solenoid of claim 13, wherein the first projections on the first side of the first hollow cylindrical element are evenly spaced;

the second projections on the first side of the second hollow cylindrical element are evenly spaced;

the first recesses on the first side of the first hollow cylindrical element are evenly spaced; and the second recesses on the first side of the second hollow cylindrical element are evenly spaced.

* * * * *